(12) United States Patent
Kashikar et al.

(10) Patent No.: US 8,615,236 B2
(45) Date of Patent: *Dec. 24, 2013

(54) SYSTEM AND METHOD FOR DYNAMICALLY MANAGING CONNECTIONS USING FEATURE PRIORITIZATION

(75) Inventors: Anand Kashikar, Sunnyvale, CA (US); Wen Zhao, San Jose, CA (US)

(73) Assignee: Palm, Inc., Sunnyvale, CA (US)

( * ) Notice: Subject to any disclaimer, the term of this patent is extended or adjusted under 35 U.S.C. 154(b) by 320 days.

This patent is subject to a terminal disclaimer.

(21) Appl. No.: 12/794,131

(22) Filed: Jun. 4, 2010

(65) Prior Publication Data

US 2011/0300865 A1    Dec. 8, 2011

(51) Int. Cl.
*H04W 4/00* (2009.01)

(52) U.S. Cl.
USPC ..... 455/435.2; 455/436; 455/437; 455/435.3; 455/558; 455/442; 455/435.1; 455/432.1; 455/150.1; 455/166.2

(58) Field of Classification Search
USPC ............... 455/435.2, 558, 550.1, 435.3, 3.04, 455/464, 62, 150.1, 166.2, 435.1, 436, 437, 455/432.1, 442

See application file for complete search history.

(56) References Cited

U.S. PATENT DOCUMENTS

| | | | |
|---|---|---|---|
| 8,223,729 B2 * | 7/2012 | Raju et al. | 370/338 |
| 2007/0254646 A1 * | 11/2007 | Sokondar | 455/432.1 |
| 2007/0255797 A1 * | 11/2007 | Dunn et al. | 709/217 |
| 2009/0233600 A1 * | 9/2009 | Johansson et al. | 455/435.2 |
| 2010/0178919 A1 * | 7/2010 | Deepak et al. | 455/435.2 |
| 2011/0116479 A1 * | 5/2011 | Jarzra et al. | 370/332 |

* cited by examiner

*Primary Examiner* — Khalid Shaheed (57) ABSTRACT

Techniques to dynamically manage wireless connections using feature prioritization are described. For example, a mobile computing device may comprise a connection management module operative to access a list of one or more wireless networks, compare feature set information for the one or more wireless networks, select a wireless network based on the comparison, and initiate a wireless connection using the selected wireless network, wherein the feature set information is contained in the list. Other embodiments are described and claimed.

30 Claims, 5 Drawing Sheets

| Connection Description | Feature 1 | Feature 2 | Feature 3 | Feature *n* |
|---|---|---|---|---|
| Connection 1 | ✓ | ✓ | | ✓ |
| Connection 2 | ✓ | ✓ | | |
| Connection 3 | | ✓ | ✓ | ✓ |
| Connection 4 | | ✓ | | ✓ |
| Connection *m* | | | ✓ | ✓ |

SYSTEM AND METHOD FOR DYNAMICALLY MANAGING CONNECTIONS USING FEATURE PRIORITIZATION

BACKGROUND

Mobile computing devices, such as smart phones, may provide various processing capabilities. For example, mobile devices may provide personal digital assistant (PDA) features, including word processing, spreadsheets, synchronization of information (e.g., e-mail) with a desktop computer, and so forth. In addition, such devices may have wireless communications capabilities. More particularly, mobile devices may employ various communications technologies to provide features, such as mobile telephony, mobile e-mail access, web browsing, and content (e.g., video and radio) reception. Exemplary wireless communications technologies include cellular, satellite, and mobile data networking technologies.

Providing such an array of functionality in a single device provides users with a variety of options in selecting appropriate wireless communications technologies or wireless networks to perform wireless communications tasks. When communicating, it is advantageous to select, manually or automatically, a wireless network based on device, network or other conditions to improve performance and user experience. As a result, it is desirable to enhance the dynamic selection of wireless communications technologies or networks. For example, it may be advantageous to dynamically select a wireless communication technology or wireless network using feature set information for one or more wireless networks. Consequently, there exists a substantial need for techniques to improve the selection and management of wireless connections.

DETAILED DESCRIPTION

Various embodiments may be generally directed to connection management techniques for a mobile computing device, such as a smart phone. Some embodiments may be particularly directed to dynamic connection management techniques for a mobile computing device based on system, network or other parameters, including feature set information prioritization for one or more wireless networks.

In one embodiment, for example, a mobile computing device may include a connection management module. In various embodiments, the connection management module may be operative to access a list of one or more wireless networks, compare feature set information for the one or more wireless networks, select a wireless network based on the comparison, and initiate a wireless connection using the selected wireless network. In some embodiments, the feature set information may be contained in the list.

Examples of feature set information may include but are not limited to one or more of network parameters, system parameters, network availability, signal quality, signal strength, connection speed, connection type, connection specification, cost of connection, a list of available voice services, a transmission quality parameter, a reliability parameter, a communication protocol, a device capability, a voice service feature, cost value, a power parameter, user preference, a location, a calling region, and so forth. Other examples of communication parameters may include without limitation a network scanning threshold parameter, a radio-frequency channel parameter, an access point parameter, a rate selection parameter, a frame size parameter, an aggregation size parameter, a packet retry limit parameter, a protocol parameter, a radio parameter, modulation and coding scheme (MCS), acknowledgement parameter, media access control (MAC) layer parameter, physical (PHY) layer parameter, and any other communication parameters affecting operations for a radio, transceiver or wireless communication technology implemented by the mobile computing device 100. The embodiments are not limited in this context.

The terms wireless network, wireless transceiver(s) and wireless connection technology are interchangeable as used hereinafter.

Dynamically selecting one of a plurality of wireless networks based on feature set prioritization of the networks may provide several advantages. For example, by enabling dynamic selection based on feature set prioritization, a user may enjoy the benefit of continually establishing connections based on device, user or application requirements, device or user preferences, cost, quality, location, time, system resources or any number of other factors at any time without unnecessarily interacting with the mobile computing device or specifically selecting a wireless network to satisfy any or all of the above factors each time a connection is desired. If a user is in an area where their home network does not provide an adequate data connection, for example, it may be advantageous for the mobile computing device to automatically and/or dynamically determine which of any available wireless networks would be most efficient and/or most likely to meet the connectivity requirements for the mobile computing device. This may be accomplished, in some embodiments, by ranking available wireless networks based on feature set information that describes or otherwise provides information regarding the capabilities for the wireless networks.

Present implementations for selecting a roaming wireless network primarily rely on a list of default roaming carriers or wireless networks that are available for a mobile computing device. For example, a default roaming carrier list may be generated by a home wireless network or carrier with whom a user has a plan agreement based on roaming agreements that exist between carriers or wireless networks. This default list may not, however, prioritize features of the roaming carriers which may result in lapses in performance for mobile computing devices when a roaming carrier or wireless network is selected based on the default list when, in some embodiments, a wireless network or carrier may be available that provides superior wireless connectivity.

In some embodiments, it may be advantageous to select the best of the available wireless network or carrier based on the features or other parameters of the carriers or networks. For example, if a cellular circuit switching connection is desired and several different cellular circuit switching connections are available (e.g. through different carriers, etc.), the best connection may be selected regardless of roaming or any other factor. Limiting user interaction in the dynamic selection, monitoring and updating of wireless connections may improve user experience and system and network performance. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1A:
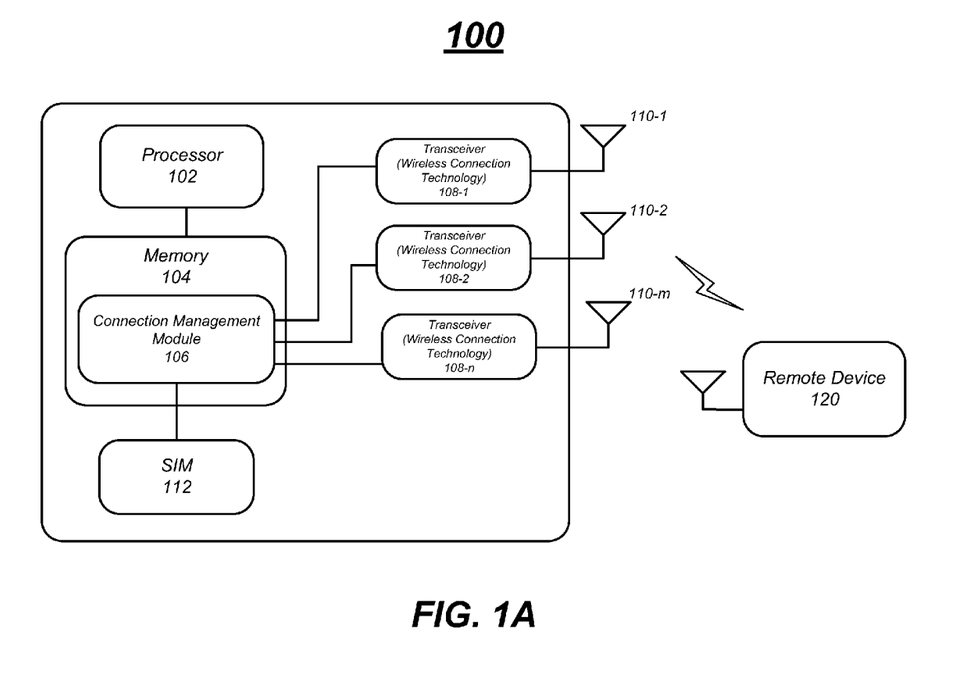
FIG. 1A illustrates one embodiment of a first mobile computing device.

FIG. 1A illustrates one embodiment of an apparatus. In particular, FIG. 1A shows a first embodiment of a mobile computing device 100. The mobile computing device 100 may include by way of example and not limitation a processor 102, a memory 104, a connection management module 106, a subscriber identity module (SIM) 112, transceivers/wireless connection technologies 108-1-$n$ and antennas 110-1-$m$. FIG. 1A also shows a remote device 120 that may be capable of or operative to communicate with or otherwise interact with mobile computing device 100 in some embodiments. These elements or portions of these elements may be implemented in hardware, software, firmware, or in any combination thereof. The embodiments are not limited to these depicted elements.

The mobile computing device 100 may be generally configured to support or provide cellular voice communication, wireless data communication and computing capabilities. The mobile computing device 100 may be implemented as a combination handheld computer and mobile telephone, sometimes referred to as a smart phone. Examples of smart phones include, for example, Palm® products such as Palm® Pre™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth. Additional details for a mobile computing device may be described in more detail with reference to FIG. 4.

Similarly, in various embodiments, remote device 120 may comprise a wireless communication device similar to mobile computing device 100 that may be generally configured to support or provide cellular voice communication, wireless data communication and computing capabilities. For example, remote device 120 may comprise a second mobile computing device, a router, a node B, cellular interface, gateway, switch or other network device capable of wirelessly communicating with mobile computing device 100. Other embodiments are described and claimed.

The mobile computing device 100 may include a processor 102 coupled to the connection management module 106 in some embodiments. The processor 102 may be operative to execute the connection management module 106. The mobile computing device 100 may further include a memory 104 coupled to the processor 102. The memory 104 may be operative to store the connection management module 106. Other embodiments are described and claimed.

The processor 102 may comprise a general purpose processor or an application specific processor arranged to provide general or specific computing capabilities for the communications system 100. For example, the processor 102 may perform operations associated with higher layer protocols and applications. For instance, the processor 102 may be implemented as a host processor to provide various user applications, such as telephony, text messaging, e-mail, web browsing, word processing, video signal display, and so forth. In addition, the processor 102 may provide one or more functional utilities that are available to various protocols, operations, and/or applications. Examples of such utilities include operating systems, device drivers, user interface functionality, and so forth.

The memory 104 may comprise computer-readable media such as volatile or non-volatile memory units arranged to store programs and data for execution by the processor 102. In some embodiments, the computer-readable media, memory or other storage device may comprise a non-transitory storage device. As depicted in FIG. 1A, the memory 104 may store a connection management module 106 in the form of executable program instructions, code or data. The processor 102 may retrieve and execute the program instructions, code or data from the memory 104 to control or provide dynamic connection management operations for the mobile computing device 100. Although the connection management module 106 is shown as part of the memory 104 for execution by the processor 102, it may be appreciated that connection management module 106 may be stored and executed by other memory and processing resources available to the mobile computing device 100. Further, although connection management module 106 is depicted as software executed by a processor, it may be appreciated that the operations for connection management module 106 may be implemented in hardware as well using one or more integrated circuits, for example. The embodiments are not limited in this context.

The mobile computing device 100 may include one or more modules, such as transceiver (connection technology) modules 108-1-$n$ and/or antennas 110-1-$m$, arranged to communicate information over one or more types of wireless communication links and/or wireless networks. Examples of a wireless communication links and/or wireless networks may include, without limitation, a radio channel, infrared channel, radio-frequency (RF) channel, WiFi channel, a portion of the RF spectrum, and/or one or more licensed or license-free frequency bands. In the latter case, the wireless nodes may include one more wireless interfaces and/or components for wireless communication, such as one or more transmitters, receivers, transmitter/receivers ("transceivers") 108-1-$n$, radios, chipsets, amplifiers, filters, control logic, network interface cards (NICs), antennas 110-1-$m$, antenna arrays, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In one embodiment, certain devices may include antenna arrays of multiple antennas to implement various adaptive antenna techniques and spatial diversity techniques. Other embodiments are described and claimed.

In various embodiments, connection management module 106 may be configured to and/or operative to dynamically select a wireless connection technology 108-1-$n$ or wireless network based on feature set information for one or more wireless networks wherein the feature set information is obtained from a list of one or more wireless networks, and to initiate a wireless connection with the wireless network using the selected wireless connection technology. For example, mobile computing device 100 may have the capability of establishing different types of wireless connections for different purposes. In some embodiments, a connection for establishing a telephone call or voice connection with a target device using one or more of cellular circuit switching, Voice over Internet Protocol (VoIP) switching over a wireless local area network, a wireless metropolitan area network or any other suitable connection technology may be possible. In various embodiments, mobile computing device 100 may also have the capability of establishing a data connection using cellular circuit switching, or switching over a wireless local area network, a wireless metropolitan area network or any other suitable connection technology. While a limited number of connection technologies for a limited number of uses are described herein for purposes of illustration, it should be understood that any suitable connection technology, wireless communication technology, wireless network or standard could be used to establish any type of wireless connection and still fall within the described embodiments.

In some embodiments, the dynamic selection of a connection technology or wireless network by the connection management module 106 may be based on feature set information for one or more wireless networks. The feature set information may comprise, for example, one or more of network parameters, system parameters, network availability, signal quality, signal strength, connection speed, connection type, connection specification, or cost of connection. While a limited number and type of feature set information is described for purposes of illustration, it should be understood that any number type or form of feature set information could be used and still fall within the described embodiments.

In various embodiments, the feature set information may be associated with or available for one or more wireless networks that may be accessible by the mobile computing device 100. For example, the one or more wireless networks comprise one or more cellular circuit switching networks, wireless local area networks or wireless metropolitan area networks. In some embodiments, the one or more wireless networks comprise one or more roaming wireless networks that are accessed when a home wireless network for the mobile computing device is not available or does not provide a predefined level of wireless connectivity.

In some embodiments, a home wireless network may comprise a wireless network with which the mobile computing device 100 or a user of the mobile computing device is registered. For example, a home wireless network may comprise a wireless network or carrier with whom a user has agreed to a service contract. A roaming wireless network may comprise, in various embodiments, a wireless network or carrier that may be operative to extend the connectivity service for a mobile computing device 100 in a location that is different from the home wireless network or that provides different or supplemental services than the home wireless network. For example, a mobile computing device 100 may utilize a roaming wireless network when a subscriber of a home wireless network uses the facilities of a roaming wireless network and the roaming wireless network has no direct pre-existing financial or service agreement with this user or the mobile computing device to send or receive information. Other embodiments are described and claimed.

The feature set information may be contained in a list available to mobile computing device 100 in some embodiments. For example, mobile computing device 100 may have access to a list of one or more wireless network and the list may include the feature set information. The list may include any relevant feature set information for any number of carriers or wireless networks and still fall within the described embodiments.

Figure 1B:
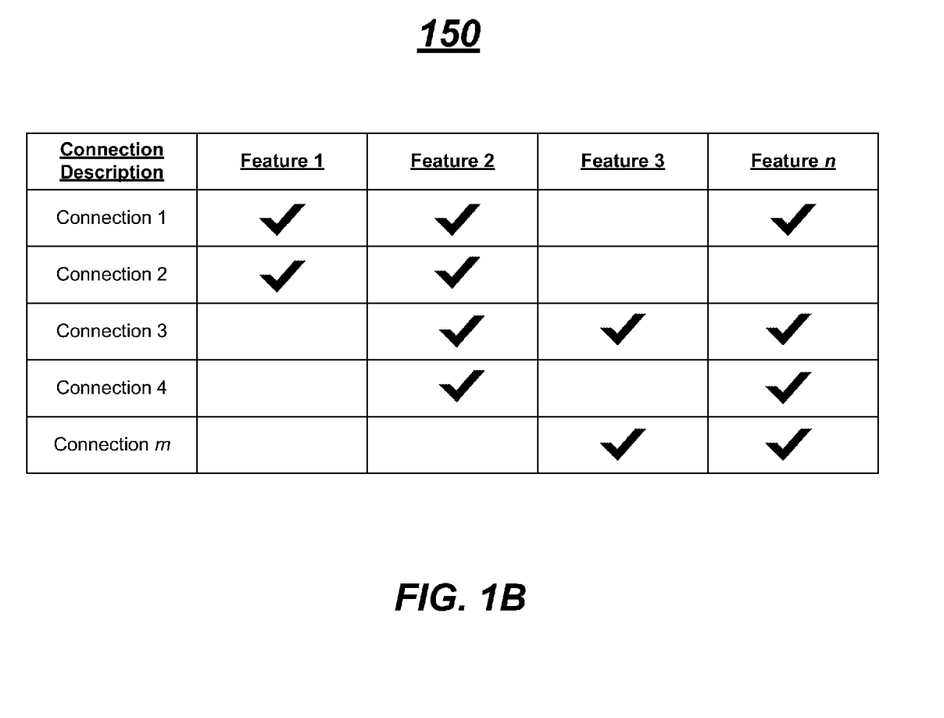
FIG. 1B illustrates one embodiments of a first feature set table.

FIG. 1B illustrates one embodiment of a list 150. List 150 may include, in some embodiments, connections 1-*m* and features 1-*n*. While a limited number of connections and features are shown for purposes of illustration, it should be understood that any number or type of connection and feature could be used and still fall within the described embodiments. Furthermore, it should also be understood that the particular arrangement of information in FIG. 1B is presented or purposes of illustration and not limitation. Any suitable arrangement of information could be used and still fall within the described embodiments.

As shown in list 150, each connection 1-*m* may include different features 1-*n*. For example, connection 1 includes features 1, 2 and n, connection 2 includes features 1 and 2, connection 3 includes features 2, 3 and n, connection 4, includes features 2 and n, and connection m includes features 3 and n. In various embodiments, connection management module 106 may use this information to determine which connection 1-*m* to select. Priority may be given to features 1 and 2, for example, and connection management module may therefore rank connections 1 and 2 higher than connections 3, 4 and m that do not include both of features 1 and 2.

List 150 simply illustrates whether or not a particular connection 1-*m* does or does not include a feature 1-*n*. In some embodiments, list 150 may additionally include information concerning the strength or quality of one or more features 1-*n*, or any other suitable information. Other embodiments are described and claimed.

In various embodiments the list may be stored on a computer-readable storage medium of the mobile computing device or it may be stored on one or more devices of the wireless networks or a home wireless network and may be wirelessly accessible by the mobile computing device 100. The computer-readable storage medium that contains the list and the feature set information may comprise a subscriber identity module (SIM) of the mobile computing device 100 in some embodiments. In various embodiments, the feature set information may be preconfigured or preloaded and stored on the SIM by a home wireless network provider or by a user of the mobile computing device. For example, a home wireless network provider may preload a SIM with roaming wireless network information, including feature set information for the roaming wireless networks or carriers. In some embodiments, a user of mobile computing device 100 may additionally or alternatively have the option of updating, changing or otherwise amending the list to reflect changes in roaming wireless networks or to reflect user preferences.

Returning to FIG. 1A, in various embodiments, connection management module 106 may be configured to access the list of one or more wireless networks. For example, if the list is stored on a memory or other computer-readable storage medium of mobile computing device 100, connection management module 106 may be operative to directly or indirectly (e.g. via processor 102, for example) obtain or otherwise access the list. In some embodiments, the list may be contained or reside in a location outside mobile computing device 100, in which case connection management module 106 may be operative to establish and manage a wireless connection with the device(s) containing the list. Other embodiments are described and claimed.

Connection management module 106 may be operative to compare feature set information for the one or more wireless networks and select a wireless network based on the comparison in various embodiments. For example, connection management module 106 may be operative to determine a desired type of wireless connection based on device or use characteristics of the mobile computing device, rank the one or more wireless networks based on the comparison and/or the desired type of wireless connection, and select a wireless network based on the ranking. In various embodiments, connection management module 106 may be operative to initiate a wireless connection using the selected wireless network.

In some embodiments, connection management module 106 may comprise or include an algorithm for implementing the ranking, comparison and/or selection using the feature set information. In various embodiments the connection management module 106 may include a default ranking of feature set information or a user configurable ranking of feature set information. The ranking may include, for example, an indication of preferences for certain types of wireless networks, features, signal strengths, or any other suitable factor.

In some embodiments, the user configurable ranking of feature set information may include a ranking of wireless voice connections, wireless data connections or one or more types of wireless voice or data connections. For example, a user may prefer to prioritize wireless networks that offer data connections over wireless network that do not offer data connections. In some embodiments, a user may also wish to prioritize wireless networks that offer faster data connections over wireless networks that offer slower data connections. For example, it may be advantageous to prioritize 4G wireless networks over 3G wireless networks, and 3G wireless networks over 2G wireless networks. Other embodiments are described and claimed.

In various embodiments, the connection management module 106 may be configured to execute an algorithm to generate an expected quality of service (QoS) or service matrix for each connection technology, wireless network or carrier and may select a connection technology or wireless network based on the expected QoS or switching matrix. For example, the algorithm may include any of the above or any other factors relevant to establishing a wireless connection using one of a plurality of available connection technologies 108-1-n. In some embodiments, the expected QoS and/or service matrix may be based on one or more performance or cost metrics for each available connection technology 108-1-n. Other embodiments are described and claimed.

In various embodiments, the connection management module 106 may be configured to automatically initiate a wireless connection with one or more target devices or remote device 120 using the dynamically selected connection technology or wireless network. For example, a user may enable the dynamic selection using the connection management module 106 as a system preference or application, and may optionally enter preferences regarding connection technologies and connections during a setup process. After being enabled, the dynamic selection and automatic connection process may continue with limited or no user interaction until the feature is disabled, altered or otherwise disconnected.

In some embodiments, dynamic selection and automatic connection initiation by the connection management module 106 may be a default feature that is implemented when a device is activated and may optionally be deactivated by a user. Making the dynamic selection based on feature set information prioritization and automatic connection a default operation may result in a user never needing to change any preferences regarding wireless connections in some embodiments, and may improve the overall performance of mobile computing device 100.

The connection management preference/application may comprise one or more visible user interfaces for ease of use in some embodiments. For example, the application may comprise a simple interface allowing a user to enable or disable the dynamic connection selection feature, and to select preferences for establishing connections, including ranking or prioritizing wireless networks or particular features of wireless networks. Preferences may include, for example, ranking of items by importance to the user, such as cost, quality, processing impact or any other factor. In some embodiments, an underlying or hidden layer may be configured for decision making. For example, the algorithm described above may comprise the underlying layer.

In various embodiments, the connection management module 106 may be configured to monitor the selected connection technology or wireless network and one or more non-selected connection technologies after a connection has been established. For example, mobile computing device 100 may establish a connection with a wireless network or remote device 120 using a dynamically selected connection technology and the connection management module 106 may, thereafter, continue to monitor to the established connection as well as other available connections. In some embodiments, the connection management module 106 may be configured to automatically perform a handoff to one of the one or more non-selected connection technologies based on changes in system, network, or other parameters. For example, if the connection management module 106 determines that a non-selected connection technology is now more advantageous than the currently implemented connection technology, a handoff may occur. The handoff may be transparent to the user in some embodiments in that the handoff occurs in the background without dropping an existing call or data connection, for example.

Operations for the above embodiments may be further described with reference to the following figures and accompanying examples. Some of the figures may include a logic diagram. Although such figures presented herein may include a particular logic diagram, it can be appreciated that the logic diagram merely provides an example of how the general functionality as described herein can be implemented. Further, the given logic diagram does not necessarily have to be executed in the order presented, unless otherwise indicated. In addition, the given logic diagram may be implemented by a hardware element, a software element executed by a processor, or any combination thereof. The embodiments are not limited in this context.

Figure 2:
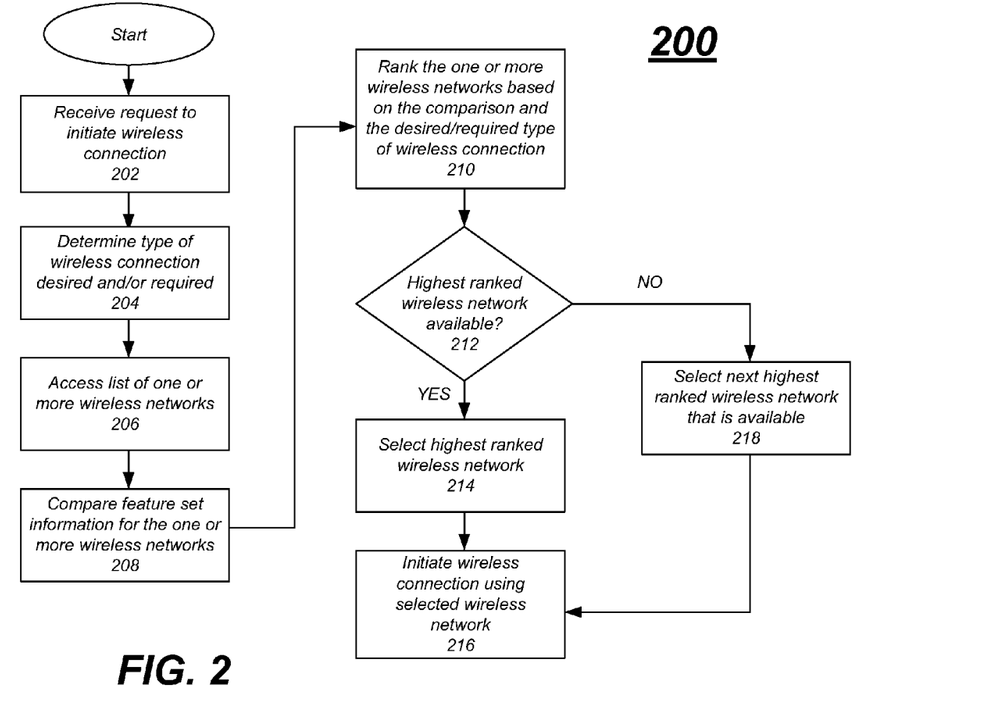
FIG. 2 illustrates one embodiment of a first logic diagram.

FIG. 2 illustrates a first embodiment of a logic diagram. In particular, FIG. 2 illustrates a logic diagram 200, which may be representative of the operations executed by one or more embodiments described herein. FIG. 2 illustrates an embodiment of a connection process for mobile computing device 100 including a connection management module 106, for example.

In various embodiments, a request to initiate a wireless connection may be received at 202. For example, a user may initiate a wireless telephone call using mobile computing device 100 in an effort to establish a wireless telephone connection with a user of a target device or a user may request an email application to check for current email using a wireless data connection. At 204, a required or desired type of wireless connection may be determined in some embodiments. For example, connection management module 106 may execute an algorithm or otherwise determine what type of wireless connection is required or acceptable to perform the task(s) associated with the requested wireless connection.

At 206, a list of one or more wireless networks may be accessed in some embodiments. For example, mobile computing device 100 may access a list of wireless networks contained in a SIM of the mobile computing device 100, wherein the list may additionally contain feature set information for the one or more wireless networks. In various embodiments, the feature set information for the one or more wireless networks may be compared at 208. Connection management module 106 may, for example, include an algorithm operative to evaluate the feature set information for the wireless networks. At 210, in some embodiments, the one or more wireless networks may be ranked based on the comparison and the desired or required type of wireless connection. For example, if the request to initiate a wireless connection requires a data connection, connection management module 106 may rank the one or more wireless networks based on the feature set information pertaining to establishing a wireless data connection.

In some embodiments, a determination is made at 212 whether or not the highest ranked wireless network is available. For example, connection management module 106 may determine, based on the comparison and ranking, which wireless network would be suit the current demands of mobile computing device 100, and may determine if this network is available for establishing a wireless connection.

If the high ranked network is available, this wireless network is selected at 214 and at 216 a wireless connection is initiated using the selected wireless network. If, on the other hand, the high ranked network is not available, the next highest ranked wireless networks will be evaluated in respective order until a suitable network is found and this network is selected at 218 and at 216 a wireless connection is initiated using the selected wireless network. Other embodiments are described and claimed.

Figure 3:
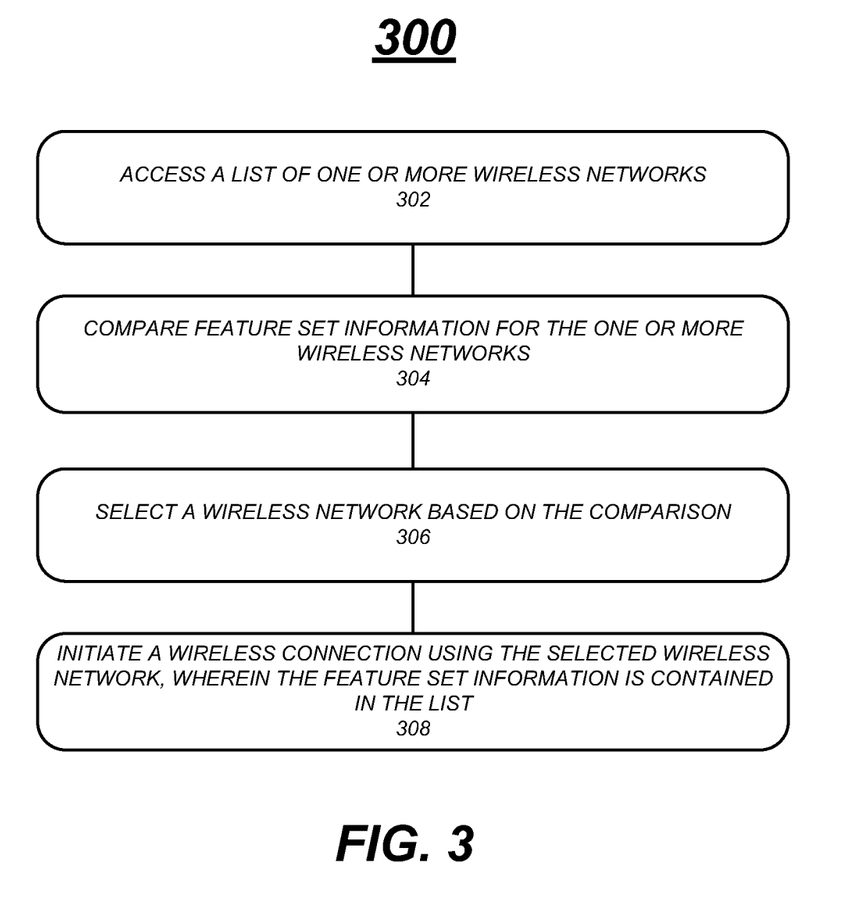
FIG. 3 illustrates one embodiment of second logic diagram.

FIG. 3 illustrates a second embodiment of a logic diagram. In particular, FIG. 3 illustrates a logic diagram 300, which may be representative of the operations executed by one or more embodiments described herein. As shown in the FIG. 3, a list of one or more wireless networks may be accessed at 302. For example, connection management module 106 may be configured to dynamically access a list of roaming wireless networks or carriers when a home wireless network is not available or will not otherwise provide sufficient wireless connectivity. At 304, in some embodiments, feature set information for the one or more wireless networks may be compared. For example, connection management module 106 may compare the features or other parameters of the available wireless networks or connection technologies to assist in selecting a suitable roaming wireless network or carrier.

In various embodiments, a wireless network may be selected based on the comparison at 306. For example, connection management module 106 may be operative to dynamically select a wireless network based on a ranking and comparison of the feature set information provided for each wireless network. In some embodiments, the feature set information is contained in the list of one or more wireless networks that may, for example, be stored on a SIM of the mobile computing device 100. At 308, in some embodiments, a wireless network connection may be initiated using the selected wireless network. Other embodiments are described and claimed.

The ranking and comparison may comprise, in some embodiments, determining a desired type of wireless connection based on device or use characteristics of the mobile computing device, ranking the one or more wireless networks based on the comparison and the desired type of wireless connection, and selecting a wireless network based on the ranking. In various embodiments, the ranking may include consideration of feature set information including but not limited to, one or more of network parameters, system parameters, network availability, signal quality, signal strength, connection speed, connection type, connection specification, or cost of connection.

Figure 4:
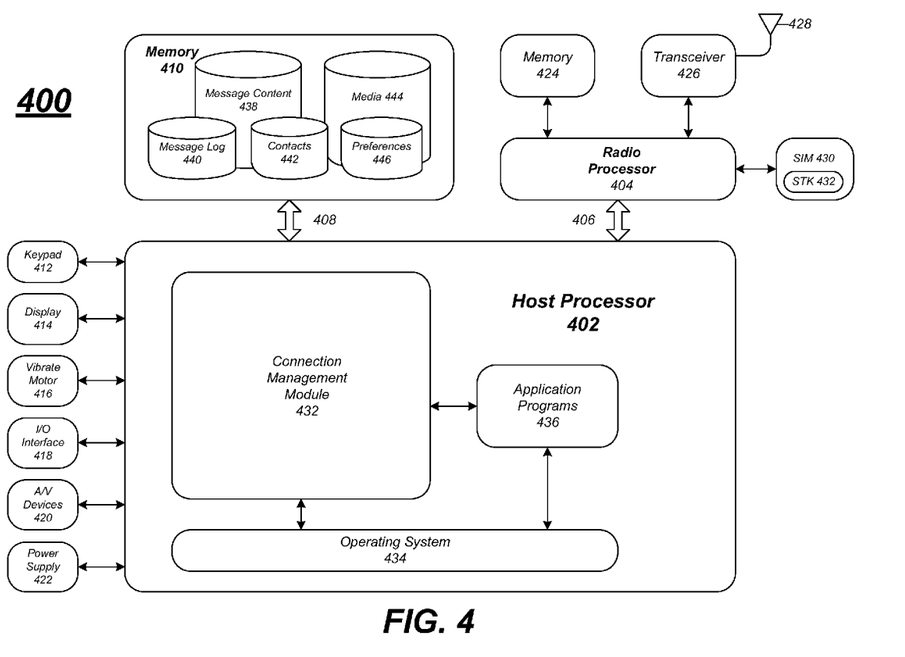
FIG. 4 illustrates one embodiment of a second mobile computing device.

FIG. 4 illustrates a block diagram of a mobile computing device 400 suitable for implementing various embodiments, including the mobile computing device 100. It may be appreciated that the mobile computing device 400 is only one example of a suitable mobile computing environment and is not intended to suggest any limitation as to the scope of use or functionality of the embodiments. Neither should the mobile computing device 400 be interpreted as having any dependency or requirement relating to any one or combination of components illustrated in the exemplary mobile computing device 400.

The host processor 402 (e.g., similar to the processor 102) may be responsible for executing various software programs such as system programs and applications programs to provide computing and processing operations for the mobile computing device 400. The radio processor 404 may be responsible for performing various voice and data communications operations for the mobile computing device 400 such as transmitting and receiving voice and data information over one or more wireless communications channels. Although the mobile computing device 400 is shown with a dual-processor architecture, it may be appreciated that the mobile computing device 400 may use any suitable processor architecture and/or any suitable number of processors in accordance with the described embodiments. In one embodiment, for example, the processors 402, 404 may be implemented using a single integrated processor.

The host processor 402 may be implemented as a host central processing unit (CPU) using any suitable processor or logic device, such as a as a general purpose processor. The host processor 402 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 402 may be coupled through a memory bus 408 to a memory 410. The memory bus 408 may comprise any suitable interface and/or bus architecture for allowing the host processor 402 to access the memory 410. Although the memory 410 may be shown as being separate from the host processor 402 for purposes of illustration, it is worthy to note that in various embodiments some portion or the entire memory 410 may be included on the same integrated circuit as the host processor 402. Alternatively, some portion or the entire memory 410 may be disposed on an integrated circuit or other medium (e.g., hard disk drive) external to the integrated circuit of the host processor 402. In various embodiments, the mobile computing device 400 may comprise an expansion slot to support a multimedia and/or memory card, for example.

The memory 410 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, randomaccess memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 400 may comprise an alphanumeric keypad 412 coupled to the host processor 402. The keypad 412 may comprise, for example, a QWERTY key layout and an integrated number dial pad. The mobile computing device 400 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 412 may comprise a physical keypad using hard buttons, or a virtual keypad using soft buttons displayed on a display 414.

The mobile computing device 400 may comprise a display 414 coupled to the host processor 402. The display 414 may comprise any suitable visual interface for displaying content to a user of the mobile computing device 400. In one embodiment, for example, the display 414 may be implemented by a liquid crystal display (LCD) such as a touch-sensitive color (e.g., 46-bit color) thin-film transistor (TFT) LCD screen. The touch-sensitive LCD may be used with a stylus and/or a handwriting recognizer program.

The mobile computing device 400 may comprise a vibrate motor 416 coupled to the host processor 402. The vibrate motor 416 may be enable or disabled according to the preferences of the user of the mobile computing device 400. When enabled, the vibrate motor 416 may cause the mobile computing device 400 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 400 may comprise an input/output (I/O) interface 418 coupled to the host processor 402. The I/O interface 418 may comprise one or more I/O devices such as a serial connection port, an infrared port, integrated Bluetooth wireless capability, and/or integrated 802.11x (WiFi) wireless capability, to enable wired (e.g., USB cable) and/or wireless connection to a local computer system, such as a local personal computer (PC). In various implementations, mobile computing device 400 may be arranged to synchronize information with a local computer system.

The host processor 402 may be coupled to various audio/video (A/V) devices 420 that support A/V capability of the mobile computing device 400. Examples of A/V devices 420 may include, for example, a microphone, one or more speakers (such as speaker system 108), an audio port to connect an audio headset, an audio coder/decoder (codec), an audio player, a Musical Instrument Digital Interface (MIDI) device, a digital camera, a video camera, a video codec, a video player, and so forth.

The host processor 402 may be coupled to a power supply 422 arranged to supply and manage power to the elements of the mobile computing device 400. In various embodiments, the power supply 422 may be implemented by a rechargeable battery, such as a removable and rechargeable lithium ion battery to provide direct current (DC) power, and/or an alternating current (AC) adapter to draw power from a standard AC main power supply.

The radio processor 404 may be arranged to communicate voice information and/or data information over one or more assigned frequency bands of a wireless communication channel. The radio processor 404 may be implemented as a communications processor using any suitable processor or logic device, such as a modem processor or baseband processor. The radio processor 404 may also be implemented as a digital signal processor (DSP), media access control (MAC) processor, or any other type of communications processor in accordance with the described embodiments. The radio processor 404 may perform analog and/or digital baseband operations for the mobile computing device 400. For example, the radio processor 404 may perform digital-to-analog conversion (DAC), analog-to-digital conversion (ADC), modulation, demodulation, encoding, decoding, encryption, decryption, and so forth.

The mobile computing device 400 may comprise a memory 424 coupled to the radio processor 404. The memory 424 may be implemented using any of the computer-readable media described with reference to the memory 410. The memory 424 may be typically implemented as flash memory and secure digital (SD) RAM. Although the memory 424 may be shown as being separate from the radio processor 404, some or all of the memory 424 may be included on the same IC as the radio processor 404.

The mobile computing device 400 may comprise a transceiver module 426 coupled to the radio processor 404. The transceiver module 426 may comprise one or more transceivers arranged to communicate using different types of protocols, communication ranges, operating power requirements, RF sub-bands, information types (e.g., voice or data), use scenarios, applications, and so forth, similar to transceivers/connection technologies 108-1-$n$ of FIG. 1. In various embodiments, the transceiver module 426 may comprise one or more transceivers arranged to support voice communications and/or data communications for the wireless network systems or protocols as previously described. In some embodiments, the transceiver module 426 may further comprise a Global Positioning System (GPS) transceiver to support position determination and/or location-based services.

The transceiver module 426 generally may be implemented using one or more chips as desired for a given implementation. Although the transceiver module 426 may be shown as being separate from and external to the radio processor 404 for purposes of illustration, it is worthy to note that in various embodiments some portion or the entire transceiver module 426 may be included on the same integrated circuit as the radio processor 404. The embodiments are not limited in this context.

The mobile computing device 400 may comprise an antenna system 428 for transmitting and/or receiving electrical signals, similar to antennas 110-1-$m$ of FIG. 1. As shown, the antenna system 428 may be coupled to the radio processor 404 through the transceiver module 426. The antenna system 428 may comprise or be implemented as one or more internal antennas and/or external antennas.

The mobile computing device 400 may comprise a subscriber identity module (SIM) 430 coupled to the radio processor 404. The SIM 430 may comprise, for example, a removable or non-removable smart card arranged to encrypt voice and data transmissions and to store user-specific data for allowing a voice or data communications network to identify and authenticate the user. The SIM 430 also may store data such as personal settings specific to the user. In some embodiments, the SIM 430 may be implemented as an UMTS universal SIM (USIM) card or a CDMA removable user identity module (RUIM) card. The SIM 430 may comprise a SIM application toolkit (STK) 432 comprising a set of programmed commands for enabling the SIM 430 to perform various functions. In some cases, the STK 432 may be arranged to enable the SIM 430 to independently control various aspects of the mobile computing device 400.

As mentioned above, the host processor 402 may be arranged to provide processing or computing resources to the mobile computing device 400. For example, the host processor 402 may be responsible for executing various software programs including system programs such as operating system (OS) 434 and application programs 436. System programs generally may assist in the running of the mobile computing device 400 and may be directly responsible for controlling, integrating, and managing the individual hardware components of the computer system. The OS 434 may be implemented, for example, as a Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Run-time Environment for Wireless (BREW) OS, JavaOS, a Wireless Application Protocol (WAP) OS, or other suitable OS in accordance with the described embodiments. The mobile computing device 400 may comprise other system programs such as device drivers, programming tools, utility programs, software libraries, application programming interfaces (APIs), and so forth.

Application programs 436 generally may allow a user to accomplish one or more specific tasks. In various implementations, the application programs 436 may provide one or more graphical user interfaces (GUIs) to communicate information between the mobile computing device 400 and a user. In some embodiments, application programs 436 may comprise upper layer programs running on top of the OS 434 of the host processor 402 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 436 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Messaging applications may be arranged to communicate various types of messages in a variety of formats. Examples of messaging applications may include without limitation a cellular telephone application, a Voice over Internet Protocol (VoIP) application, a Push-to-Talk (PTT) application, a voicemail application, a facsimile application, a video teleconferencing application, an IM application, an e-mail application, an SMS application, an MMS application, and so forth. It is also to be appreciated that the mobile computing device 400 may implement other types of applications in accordance with the described embodiments.

The host processor 402 may include a connection management module 432. The connection management module 432 may be the same or similar to the connection management module 106 described with reference to FIG. 1.

The mobile computing device 400 may include various databases implemented in the memory 410. For example, the mobile computing device 400 may include a message content database 438, a message log database 440, a contacts database 442, a media database 444, a preferences database 446, and so forth. The message content database 438 may be arranged to store content and attachments (e.g., media objects) for various types of messages sent and received by one or more messaging applications. The message log 440 may be arranged to track various types of messages which are sent and received by one or more messaging applications. The contacts database 442 may be arranged to store contact records for individuals or entities specified by the user of the mobile computing device 400. The media database 444 may be arranged to store various types of media content such as image information, audio information, video information, and/or other data. The preferences database 446 may be arranged to store various settings such as rules and parameters for controlling the operation of the mobile computing device 400.

In some cases, various embodiments may be implemented as an article of manufacture. The article of manufacture may include a storage medium arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device, comprising:
a connection management module operative to access a list of at least a first and second wireless networks, compare feature set information for the at least first and second wireless networks, select a wireless network based on the comparison, initiate a wireless connection using the selected wireless network, and automatically perform a handoff to one of the non-selected wireless networks based on a change in one or more of a system, network or the feature set information for the at least first and second wireless networks, wherein the feature set information and information about a strength or quality of one or more features are contained in the list, the first wireless network including one or more features and the second wireless network including at least one feature included in the first wireless network and at least one feature not included in the first wireless network.

2. The mobile computing device of claim 1, the connection management module operative to:
determine a desired type of wireless connection based on device or use characteristics of the mobile computing device;
rank the at least first and second wireless networks based on the comparison and the desired type of wireless connection; and
select a wireless network based on the ranking.

3. The mobile computing device of claim 1, the feature set information comprising one or more of network parameters, system parameters, network availability, signal quality, signal strength, connection speed, connection type, or connection specification, or cost of connection.

4. The mobile computing device of claim 1, wherein the list of the at least first and second wireless networks is stored on a computer-readable storage medium of the mobile computing device.

5. The mobile computing device of claim 4, wherein the computer-readable storage medium comprises a subscriber identity module (SIM) and wherein the feature set information is preconfigured and stored on the SIM by a home wireless network provider.

6. The mobile computing device of claim 1, wherein the list of the at least first and second wireless networks is stored on the at least first and second wireless networks or a home wireless network and is wirelessly accessible by the mobile computing device.

7. The mobile computing device of claim 1, wherein the at least first and second wireless networks comprise one or more roaming wireless networks that are accessed when a home wireless network for the mobile computing device is not available or does not provide a predefined level of wireless connectivity.

8. The mobile computing device of claim 1, wherein the at least first and second wireless networks comprise one or more cellular circuit switching networks, wireless local area networks or wireless metropolitan area networks.

9. The mobile computing device of claim 1, the connection management module including a default ranking of feature set information or a user configurable ranking of feature set information.

10. The mobile computing device of claim 9, wherein the user configurable ranking of feature set information includes a ranking of wireless voice connections, wireless data connections or one or more types of wireless voice or data connections.

11. A computer-implemented method, comprising:
accessing a list of at least a first and second wireless networks;
comparing feature set information for the at least first and second wireless networks;
selecting a wireless network based on the comparison;
initiating a wireless connection using the selected wireless network; and
automatically performing a handoff to one of the non-selected wireless networks based on a change in one or more of a system, network or the feature set information for the at least first and second wireless networks,
wherein the feature set information and information about a strength or quality of one or more features are contained in the list, the first wireless network including one or more features and the second wireless network including at least one feature included in the first wireless network and at least one feature not included in the first wireless network.

12. The method of claim 11, comprising:
determining a desired type of wireless connection based on device or use characteristics of the mobile computing device;
ranking the at least first and second wireless networks based on the comparison and the desired type of wireless connection; and
selecting a wireless network based on the ranking.

13. The method of claim 11, the feature set information comprising one or more of network parameters, system parameters, network availability, signal quality, signal strength, connection speed, connection type, connection specification, or cost of connection.

14. The method of claim 11, comprising:
accessing the list from a computer-readable storage medium of the mobile computing device.

15. The method of claim 14, wherein the computer-readable storage medium comprises a subscriber identity module (SIM) and wherein the feature set information is preconfigured and stored on the SIM by a home wireless network provider.

16. The method of claim 11, comprising:
accessing the list from the at least first and second wireless networks or a home wireless network.

17. The method of claim 11, comprising:
accessing the at least first and second wireless networks when a home wireless network for the mobile computing device is not available or does not provide a predefined level of wireless connectivity, wherein the at least first and second wireless networks comprise one or more roaming wireless networks.

18. The method of claim 11, wherein the at least first and second wireless networks comprise one or more cellular circuit switching networks, wireless local area networks or wireless metropolitan area networks.

19. The method of claim 11, comprising:
establishing a default ranking of feature set information or a user configurable ranking of feature set information.

20. The method of claim 19, wherein the user configurable ranking of feature set information includes a ranking of wireless voice connections, wireless data connections or one or more types of wireless voice or data connections.

21. An article comprising a non-transitory computer-readable storage medium containing instructions that if executed by a processor enable a system to:
access a list of at least a first and second wireless networks;
compare feature set information for the at least first and second wireless networks;
select a wireless network based on the comparison; and
initiate a wireless connection using the selected wireless network; and
automatically performing a handoff to one of the non-selected wireless networks based on a change in one or more of a system, network or the feature set information for the at least first and second wireless networks,
wherein the feature set information and information about a strength or quality of one or more features are contained in the list, the first wireless network including one or more features and the second wireless network including at least one feature included in the first wireless network and at least one feature not included in the first wireless network.

22. The article of claim 21, comprising instructions that if executed enable the system to:
determine a desired type of wireless connection based on device or use characteristics of the mobile computing device;
rank the at least first and second wireless networks based on the comparison and the desired type of wireless connection; and
select a wireless network based on the ranking.

23. The article of claim 21, the feature set information comprising one or more of network parameters, system parameters, network availability, signal quality, signal strength, connection speed, connection type, connection specification, or cost of connection.

24. The article of claim 21, comprising instructions that if executed enable the system to:
access the list from a computer-readable storage medium of the mobile computing device.

25. The article of claim 24, wherein the computer-readable storage medium comprises a subscriber identity module (SIM) and wherein the feature set information is preconfigured and stored on the SIM by a home wireless network provider.

26. The article of claim 21, comprising instructions that if executed enable the system to:
access the list from the at least first and second wireless networks or a home wireless network.

27. The article of claim 21, comprising instructions that if executed enable the system to:
access the at least first and second wireless networks when a home wireless network for the mobile computing device is not available or does not provide a predefined level of wireless connectivity, wherein the at least first and second wireless networks comprise one or more roaming wireless networks.

28. The article of claim 21, wherein the at least first and second wireless networks comprise one or more cellular circuit switching networks, wireless local area networks or wireless metropolitan area networks.

29. The article of claim 21, comprising instructions that if executed enable the system to:
establish a default ranking of feature set information or a user configurable ranking of feature set information.

30. The article of claim 29, wherein the user configurable ranking of feature set information includes a ranking of wireless voice connections, wireless data connections or one or more types of wireless voice or data connections.

* * * * *